(No Model.)
C. H. WEISGERBER, Jr.
SLED.
No. 326,362. Patented Sept. 15, 1885.
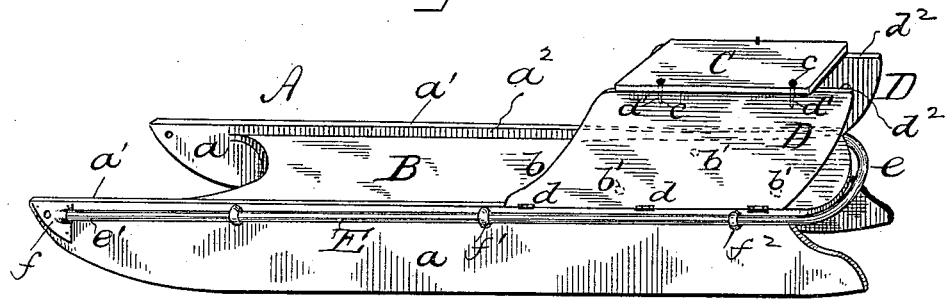
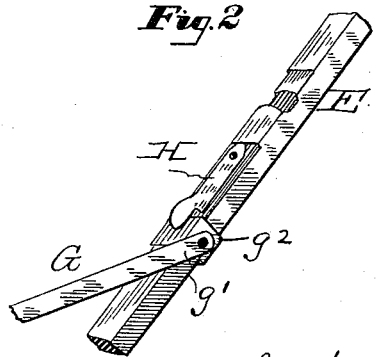
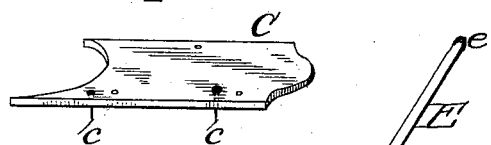
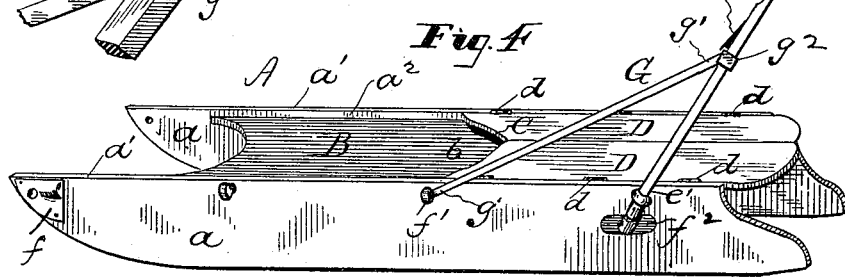
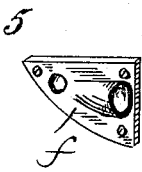
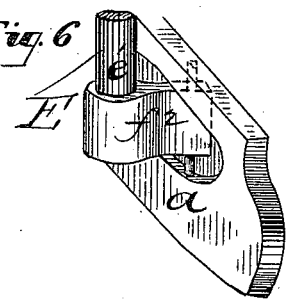
WITNESSES:
S. Oler
G. Moore
INVENTOR
C. H. Weisgerber Jr.
By S. J. Van Stavoren
ATTORNEY

UNITED STATES PATENT OFFICE.

CHARLES H. WEISGERBER, JR., OF PHILADELPHIA, PENNSYLVANIA.

SLED.

SPECIFICATION forming part of Letters Patent No. 326,362, dated September 15, 1885.

Application filed June 19, 1884. (No model.)

*To all whom it may concern:*

Be it known that I, CHARLES H. WEISGERBER, Jr., a citizen of the United States, residing at Philadelphia, in the county of Philadelphia and State of Pennsylvania, have invented certain new and useful Improvements in Sleds, of which the following is a specification, reference being had therein to the accompanying drawings, wherein—

Figure 1 is a perspective of a sled with raised seat embodying my invention. Fig. 2 is a broken detail perspective illustrating the catch or lock for holding the sled-pushing rod in a fixed or adjusted position. Fig. 3 is a detail perspective of the movable seat for the sled. Fig. 4 is a perspective view showing a coasting-sled or one having a low-down seat, the convertible or raised seat being dropped or lowered to form the coasting-sled, which is also shown provided with the push-rod; and Figs. 5 and 6 are perspective details.

My invention has relation to sleds; and it has for its objects to provide a sled with a convertible seat or one capable of being raised and lowered to form either a coasting-sled or a sleigh, and to furnish the latter with a guard or hand rail which can be utilized for a push-rod or handle therefor.

My invention accordingly consists of the combination, construction, and arrangement of parts comprising a sled having a convertible or movable seat and a combined guard-rail and push-rod, with mechanism for locking it in a fixed position, as hereinafter more particularly described and claimed.

In the drawings, A represents a coasting or other sled of any suitable construction and desired configuration, the sides $a\ a$ of which preferably have their upper edges, $a'\ a'$, projecting above the plane of the sled floor or platform B, which has heretofore constituted the main seat of the sled. Such projection of the sides or edges $a'\ a'$ is provided to form a depression or space, $a^2$, between the top of the floor B and said edges $a'$.

In the end $b$ of floor B are a series of holes, as indicated by dotted lines $b'$, Fig. 1, into which pass dowels or pins $c$ on a board or movable or convertible seat, C, when the same is resting or is closed down upon the end $b$ of floor B.

At end $b$ are also secured folding flaps or side boards, D D, which are hinged at $d$ to the sides $a\ a$, as shown, and have openings $d'$ in their meeting edges $d^2$, to receive the dowels $c$ on movable seat C when it is in its raised position. These flaps D D, when folded, rest upon the closed or lowered seat-board C, which is then held in position between the floor B and the folded flaps D D, as represented in Fig. 4, to form a coasting-sled or one having the usual single low-down seat, or one which is substantially in the same plane. In this condition the closed flaps D D form the seat proper of the sled.

To convert the sled from a low-down to a high or raised seat sled or sleigh, the hinged or movable flaps D D are first turned up until they assume a vertical position. The movable seat C is then withdrawn or raised from the floor B, and its dowels $c\ c$ are inserted in the openings $d'$ in the edges $d^2$ of flaps D, as shown in Fig. 1. In this condition the flaps D are united or held firmly in their vertical position by the seat C, and they form a support for the latter.

The sled A is furnished with the usual or other guard-rail, E, made in one or more pieces or sections, and has a bent end or cross-bar, $e$. If desired, this rail may be permanently attached to the sled in the well-known manner; or it may be removably attached thereto, so that it can be withdrawn from its supports and used as a push-rod or handle for propelling the sled. In the latter case the ends $e'$ of the rail enter the fixed eyes $f$, (more plainly shown in Fig. 5,) and $f'\ f^2$ are other eyes secured to sides $a$ for supporting rail E. These eyes $f'$ and $f^2$ are preferably swiveled to sides $a$ in any well-known way, or as shown in a pending application for sleds filed of an even date herewith, or as indicated in Fig. 6.

To remove the rail E from its position shown in Fig. 1, it is drawn backwardly or to the right until its ends $e$ rest in the swiveled eyes $f^2$, whereupon the rail may be turned up or raised to any desired angular position, as illustrated in Fig. 4, and used for a push-rod for moving the sled along.

To lock or firmly secure the rail in its last-described position, it is provided with braces G, the ends $g$ of which are pivoted to the swiveled eyes $f'$, or otherwise, as desired, and the ends $g'$ thereof are loosely secured to sleeves $g^2$ $g^2$, which slide up and down upon the rail E during the movement required to effect its withdrawal from its supporting-eyes when it is to be converted from a guard-rail to push-rod, or vice versa.

To hold the slides or sleeves $g^2$ in a fixed position after the rail E is adjusted for a push-rod, it is provided with spring or movable catches H of any desired form of construction, against which the sleeves $g^2$ impinge when pushing pressure is applied to rod E, and maintains said parts in due relative position shown in Fig. 4.

The rail or rod E is dropped or converted into a guard-rail by simply depressing or moving catches H out of the way of the slides $g^2$, to permit the latter to pass over the former as rod E is lowered and pushed into its supporting-eyes $f f'$.

The construction and arrangement of the catches H and sliding sleeves $g^2$ are more plainly shown in Fig. 2. If desired, however, any other suitable form of locking mechanism may be used for securing the guard-rail in its elevated position for use as a push-rod.

From the foregoing it will be noted that the floor or usual seat of the sled is made in two parts, one being a fixed and the other a movable part, whereby a low-down or raised seat may be provided for the sled, as desired, and that its guard-rail E is so constructed and arranged that it can be utilized for a push-rod.

What I claim is—

1. A sled having a fixed seat or floor, B, a movable seat, C, and hinged side flaps, D, substantially as and for the purpose set forth.

2. A sled having a movable guard-rail, E, substantially as and for the purpose set forth.

3. In combination with a sled, the movable guard-rail E and means for locking it in position for use as a push-rod, substantially as shown and described.

4. A sled having guard-rail E, braces G, and catches H, substantially as shown and described.

5. A sled having guard-rail E and fixed and swiveled supports $f$ $f^2$, substantially as and for the purpose set forth.

6. A guard-rail, E, for a sled, and having eyes or supports $f f' f^2$ and bend $e$, substantially as shown and described.

7. In combination with a sled, the hinged flaps D, having openings $d'$, and the movable seat C, having dowels $c$, substantially as shown and described.

In testimony whereof I affix my signature in presence of two witnesses.

CHARLES H. WEISGERBER, JR.

Witnesses:
JOHN RODGERS,
S. J. VAN STAVOREN.